US012445945B2

(12) United States Patent
Gopi et al.

(10) Patent No.: US 12,445,945 B2
(45) Date of Patent: Oct. 14, 2025

(54) SCALABLE PERSONAL DEVICE SHARING

(71) Applicant: Hewlett Packard Enterprise Development LP, Spring, TX (US)

(72) Inventors: Vinay Gopi, Bangalore (IN); Anjanish Pandey, Bangaluru (IN); Suresh Vaidya, Bengaluru (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 419 days.

(21) Appl. No.: 18/124,469

(22) Filed: Mar. 21, 2023

(65) Prior Publication Data

US 2024/0323816 A1 Sep. 26, 2024

(51) Int. Cl.
*H04W 48/16* (2009.01)
*H04L 61/4511* (2022.01)
*H04W 8/26* (2009.01)
*H04W 12/069* (2021.01)

(52) U.S. Cl.
CPC ......... *H04W 48/16* (2013.01); *H04L 61/4511* (2022.05); *H04W 8/26* (2013.01); *H04W 12/069* (2021.01)

(58) Field of Classification Search
CPC ..... H04W 48/16; H04W 12/069; H04W 8/26; H04L 61/4511
See application file for complete search history.

(56) References Cited

PUBLICATIONS

Cheshire et al., "Multicast DNS", Request for Comments: 6762, Apple Inc., Feb. 2013, 70 pages.

*Primary Examiner* — Kristie D Shingles
(74) *Attorney, Agent, or Firm* — Yao Legal Services, Inc.

(57) ABSTRACT

An access point (AP) receives a network-access request comprising a first multi-pre-shared key (MPSK) password and queries an authentication server to determine an owner of a first device based on the first MPSK password. The AP receives, from the first device, an advertisement packet indicating a service provided by the first device and forwards information about the service and the owner to a device-sharing server to obtain a device-sharing policy. The AP enforces the device-sharing policy, which can include receiving from a second device, a multicast Domain Name System (mDNS) query, indicating the first device in an mDNS response corresponding to the mDNS query in response to determining that the second device belongs to the owner of the first device based on a second MPSK password of the second device, and allowing the second device to access the service provided by the first device.

20 Claims, 7 Drawing Sheets

SCALABLE PERSONAL DEVICE SHARING

BACKGROUND

Field

This disclosure is generally related to device sharing in a network using multicast Domain Name System (mDNS). More specifically, this disclosure is related to facilitating mDNS-based device sharing in a large network while considering the ownership of the different devices.

BRIEF DESCRIPTION OF THE FIGURES

In the figures, like reference numerals refer to the same figure elements.

DETAILED DESCRIPTION

Multicast Domain Name System (mDNS) is a small-scale implementation of the DNS protocol and can be used to resolve hostnames to Internet protocol (IP) addresses without the need of a dedicated DNS server. mDNS is a convenient and efficient way to enable communication between devices on the same local network, such as connecting to home printers, streaming media, or sharing files between computers. While mDNS makes it easier to share devices, proper security measures are needed to protect devices shared through mDNS. For example, when different users are accessing the same local network using various devices, it is important to ensure that each user's personal devices are not shared with anyone ese. One way to achieve access control is through device registration, where users are required to register their own personal devices. However, a large device-registration database will be needed for a large-scale network (e.g., an enterprise network or a campus network) with many users. Maintaining the database and ensuring that all entries are timely updated through periodic synchronization can lead to scalability challenges, such as a large memory footprint and increased consumption of bandwidth and processing power. Moreover, requiring the users to register their devices can also inconvenience the users.

The instant disclosure provides a solution to the aforementioned problems by enabling registration-free device sharing in a network. More specifically, the solution incorporates an authentication service that facilitates the authentication of users and a device-sharing service that configures the visibility of devices based on their corresponding ownerships. Instead of a pre-shared key (PSK), each user can be required to access the network using a user-specific multi-PSK (MPSK). Each user device accessing the network can then be registered to its owner automatically, without the need for manual registration. The device-sharing service can communicate the device-sharing policies associated with client devices to access points (APs) in the network such that a client device can only be visible to devices belonging to the same owner, thus effectively creating a virtual mDNS personal area network (PAN) for each user.

Figure 1:
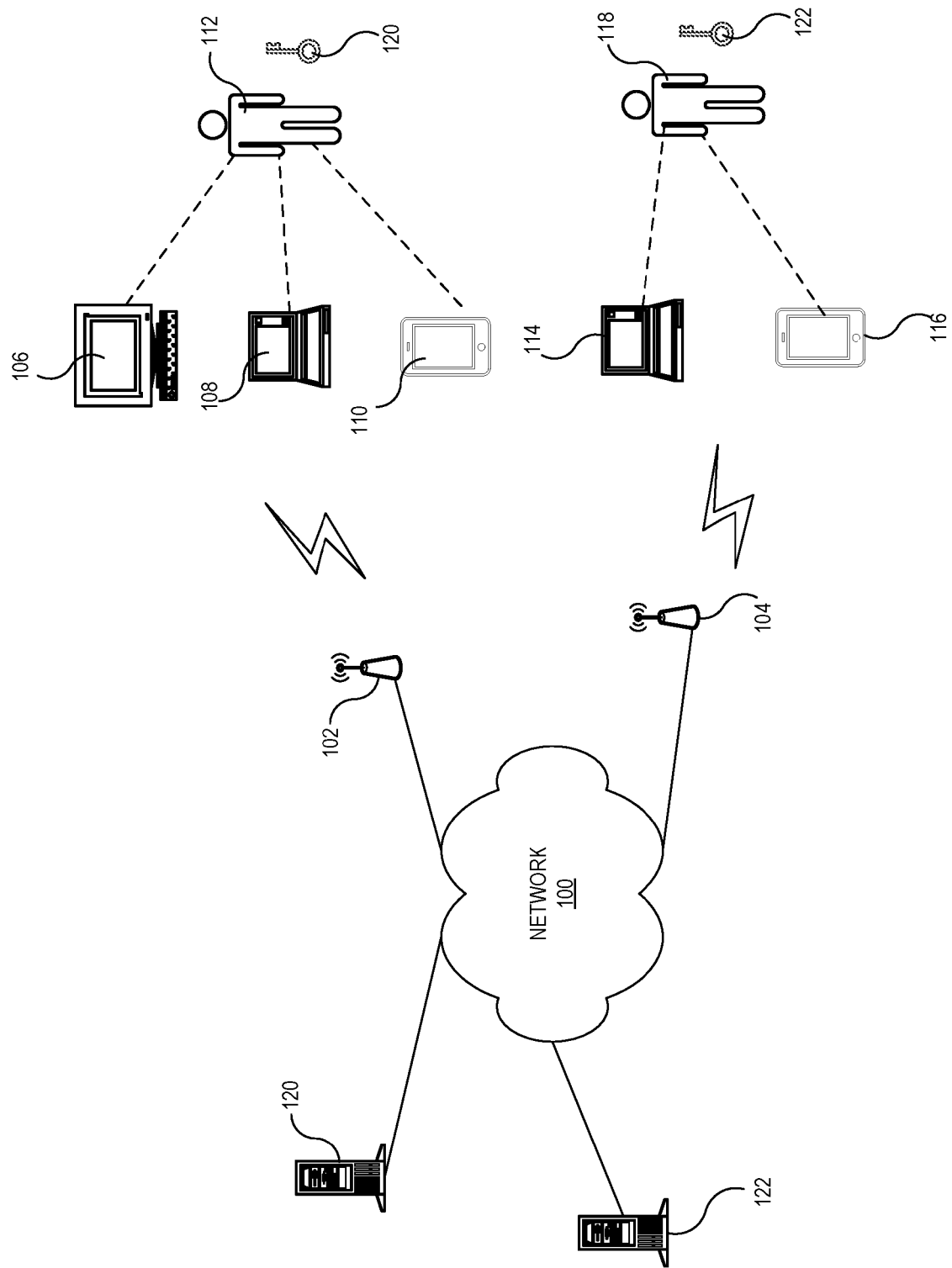
FIG. 1 illustrates an example of a network environment that facilitates device sharing, according to one aspect of the instant application.

IG. 1 illustrates an example of a network environment that facilitates device sharing, according to one aspect of the instant application. FIG. 1 shows a number of client devices coupled to a network 100 via a number of access points (APs) (e.g., APs 102 and 104). The client devices can belong to different users. In this example, client devices 106, 108, and 110 belong to a user 112, and client devices 114 and 116 belong to a user 118. Note that each client device may access network 100 via any one of the APs, depending on the location of the client device and other factors (e.g. the load of the APs) that may affect the selection of the AP. FIG. 1 also shows an authentication server 120 and a device-sharing server 122 coupled to network 100. The client devices and APs can be coupled to authentication server 120 and device-sharing server 122 via network 100. Authentication server 120 can provide user authentication services, and device-sharing server 122 can provide mDNS-based device-sharing services to the client devices. Note that, although shown as standalone servers in FIG. 1, authentication server 120 and device-sharing server 122 can also be implemented as cloud-based servers.

mDNS allows the client devices coupled to network 100 to share resources. For example, client device 110 (which can be a smartphone) can stream videos to client device 106 (which can be a smart TV) for displaying. However, although being connected to the same network, one may not wish to allow device sharing across devices belonging to different users. In the example shown in FIG. 1, smart TV 106 belongs to user 112, and smartphone 116 belongs to user 118. For security purposes, it is unlikely that user 112 allows smartphone 116 to stream video to smart TV 106.

In conventional approaches, to prevent the sharing of devices belonging to different users, each user needs to register his or her personal devices to the device-sharing service provided by device-sharing server 122, such that each device can only receive mDNS query responses from other devices belonging to the same user. For example, user 112 can register client devices 106, 108, and 110 to the device-sharing service to allow device sharing among these devices. Similarly, user 118 can register client devices 114 and 116 to allow device sharing between these two devices. The device-registration process typically requires users to manually input the device information, which can be cumbersome to the users. Moreover, the device-sharing service needs to maintain a database to store information about all devices accessing the network. Because the devices access the network dynamically, the device database needs to be updated dynamically. Maintaining and updating such a database can be challenging for a large-scale network with many users and many client devices.

To eliminate the need for manual registration of the client devices and simplify the process of maintaining and updating the device information, according to some aspects of the instant application, the device-registration process can be combined with the user-authentication process. More specifically, each time a client device accesses network 100 (e.g., via AP 102 or 104), authentication server 120 may authenticate the user and associate the client device with the device owner. When the client device advertises for services, device-sharing server 122 can determine a device-sharing policy based on the network role of the device owner.

Many mechanisms can be used to authenticate users. According to some aspects, user authentication can be achieved via the distribution of user-specific MPSKs. MPSK is an extension of the original network security protocol PSK, which used a single key (e.g., a PSK) for both authentication and encryption. Note that existing large-scale networks (e.g., an enterprise network or a campus network) typically rely on PSK Service Set Identifier (SSID) to create secure connections between the wireless router and devices accessing the network. Because the PSK is shared by the network administrator with many users, it can be challenging to map the devices to their corresponding owners. However, with MPSK, each device on the network can be assigned a unique key for authentication and encryption. Compared with the PSK scheme, the MPSK scheme can provide stronger security.

The unique keys used in the MPSK scheme makes it possible to link a user's identity with a PSK for accessing the network. To do so, instead of providing each device a unique key, authentication server 120 can provide each user with a unique PSK. For example, user 112 can be provided with a unique PSK 120, and user 118 can be provided with a unique PSK 122. Authentication server 120 can maintain the mapping between the PSKs and the identity of the users. According to some aspects, a user-specific PSK can include a password or a passphrase. The length and/or format of the PSK can be predetermined or arbitrary. The user's identity can be represented using a username, with each user being associated with a unique username. The username and/or password can be assigned to the users by authentication server 120 or chosen by the user when the user registers for services with authentication server 120.

In the example shown in FIG. 1, each user's personal device can use a corresponding user-specific PSK to access network 100. For example, client devices 106, 108, and 110 can use PSK 120 to connect to AP 102 or 104, and client devices 114 and 116 can use PSK 122 to connect to AP 102 or 104. The AP receiving the connection request can validate the PSK by communicating with authentication server 120. Authentication server 120 can validate the PSK, look up a corresponding username, and return the username to the AP. Accordingly, the AP can keep a record of the mapping between the client device and the owner's username. Note that this mapping is obtained in an automated manner, without manual intervention from the user.

Device-sharing server 122 can keep track of the device-sharing policy associated with each username. The device-sharing policy can specify whether a user's devices should be private or public. A public device can be visible to all devices on the network, whereas a private device can only be visible to other devices belonging to the same user. Each time the AP receives an advertisement packet from a client device, the AP can query device-sharing server 122 for the device-sharing policy. When the AP receives an mDNS query requesting services from the client device, the AP can enforce the corresponding device-sharing policy.

Figure 2:
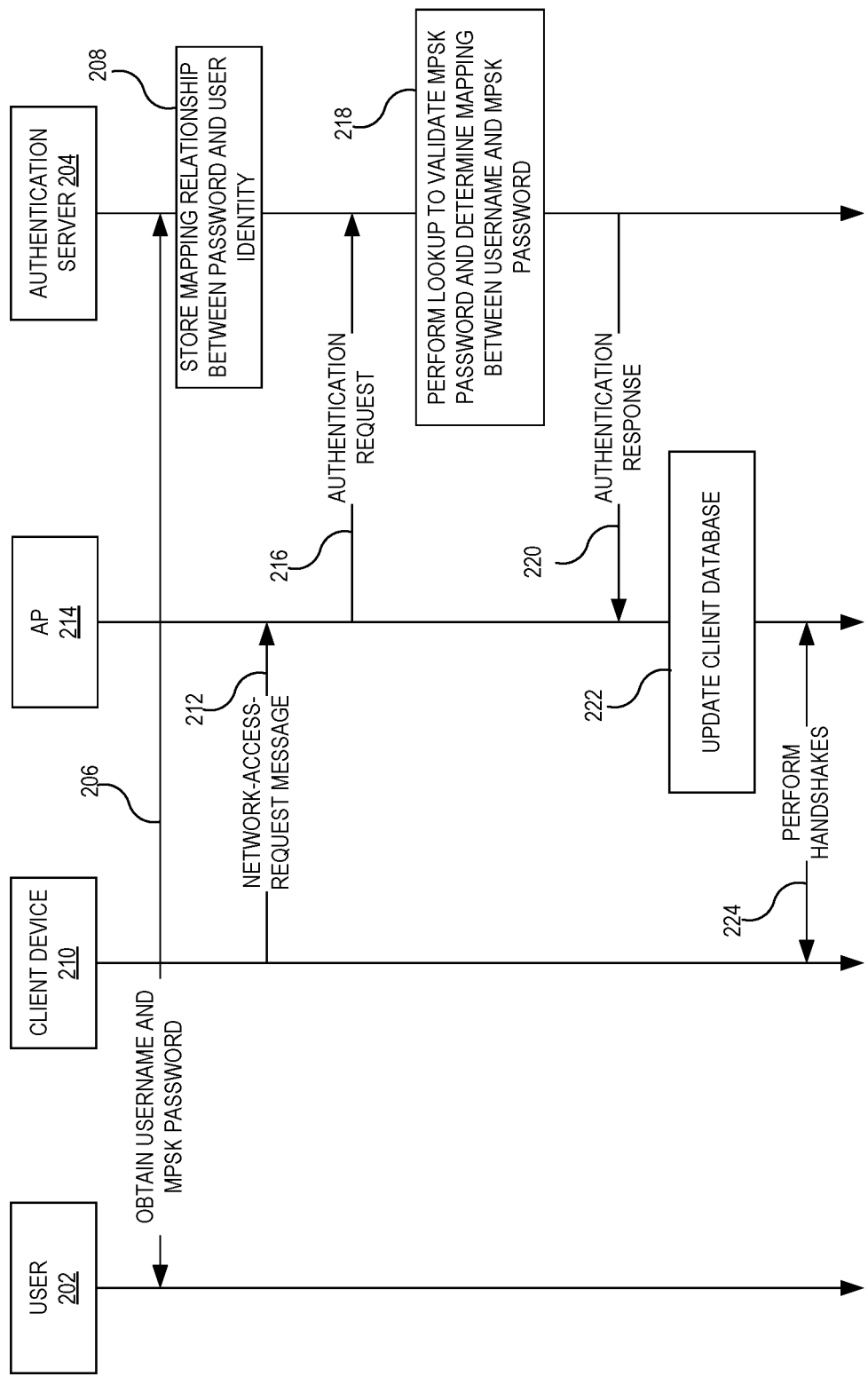
FIG. 2 illustrates an example of an automated device registration process, according to one aspect of the instant application.

FIG. 2 illustrates an example of the automated device-registration process, according to one aspect of the instant application. During application, a user 202 can interact with an authentication server 204 to obtain a username and an MPSK password (operation 206). In one implementation example, the network administrator can distribute a Uniform Resource Locator (URL) of a user-authentication webpage to users, and a user can access the webpage to obtain the username and MPSK password by providing certain credentials to verify his or her identity. Note that user 202 can use any computing device, either a personal device or a public device, to obtain the username and MPSK password. Authentication server 204 can store the mapping relationship between the MPSK password and the identity of user 202, which can be linked to the username (operation 208). For example, authentication server 206 can maintain a user-information database that stores the user's identity information (e.g., student or employee ID), username, and corresponding MPSK password.

A client device 210 can subsequently send a network-access-request message 212 carrying an MPSK password (i.e. the user-specific PSK) to an AP 214, requesting access to the network. Upon receiving network-access-request message 212, AP 214 can send an authentication request 216 to authentication server 204. According to some aspects, authentication server 204 can be a Remote Authentication Dial-In User Service (RADIUS) server, which can provide centralized authentication, authorization, and accounting management services. Authentication request 216 can include a RADIUS request that carries the MPSK password and the media access control (MAC) address of client device 210. Upon receiving authentication request 216, authentication server 204 can perform a lookup in the user-information database to validate the received MPSK password and determine the mapping between the MPSK password and the username (operation 218).

Subsequently, authentication server 204 can send an authentication response 220 to AP 214. According to some aspects, authentication response 220 can include the username corresponding to the MPSK password. According to a further aspect, in addition to the username, authentication response 220 can also include information indicating the network role associated with the username. For example, authentication response 220 can specify whether the user has an administrative role. In one example, authentication response 220 can be a RADIUS response, and the username and network role can be included in the vendor-specific attribute (VSA) field of the RADIUS response. Upon receiving authentication response 220, AP 214 can update its client database to record the mapping between the MAC address of client device 210 and the username/role of the corresponding device owner (operation 222).

Once the MPSK password is successfully validated, client device 210 and AP 214 can perform a series of handshakes (operation 224) to establish a secure connection, thereby allowing client device 210 to access the network via AP 214. According to some aspects, the handshakes can include a four-way handshake used to establish and exchange appropriated cryptographic keys. As can be seen from FIG. 2, each time a client device accessed the network, the ownership of the client device is automatically determined based on the MPSK password, and there is no need for the device owner to manually register the device.

According to the mDNS protocol, some client devices can advertise services (e.g., printing services, screen-sharing services, file-storage services, etc.) to the network, and some client devices can query services. Note that the same device (e.g., a smartphone) can advertise and query services at the same time.

Figure 3:
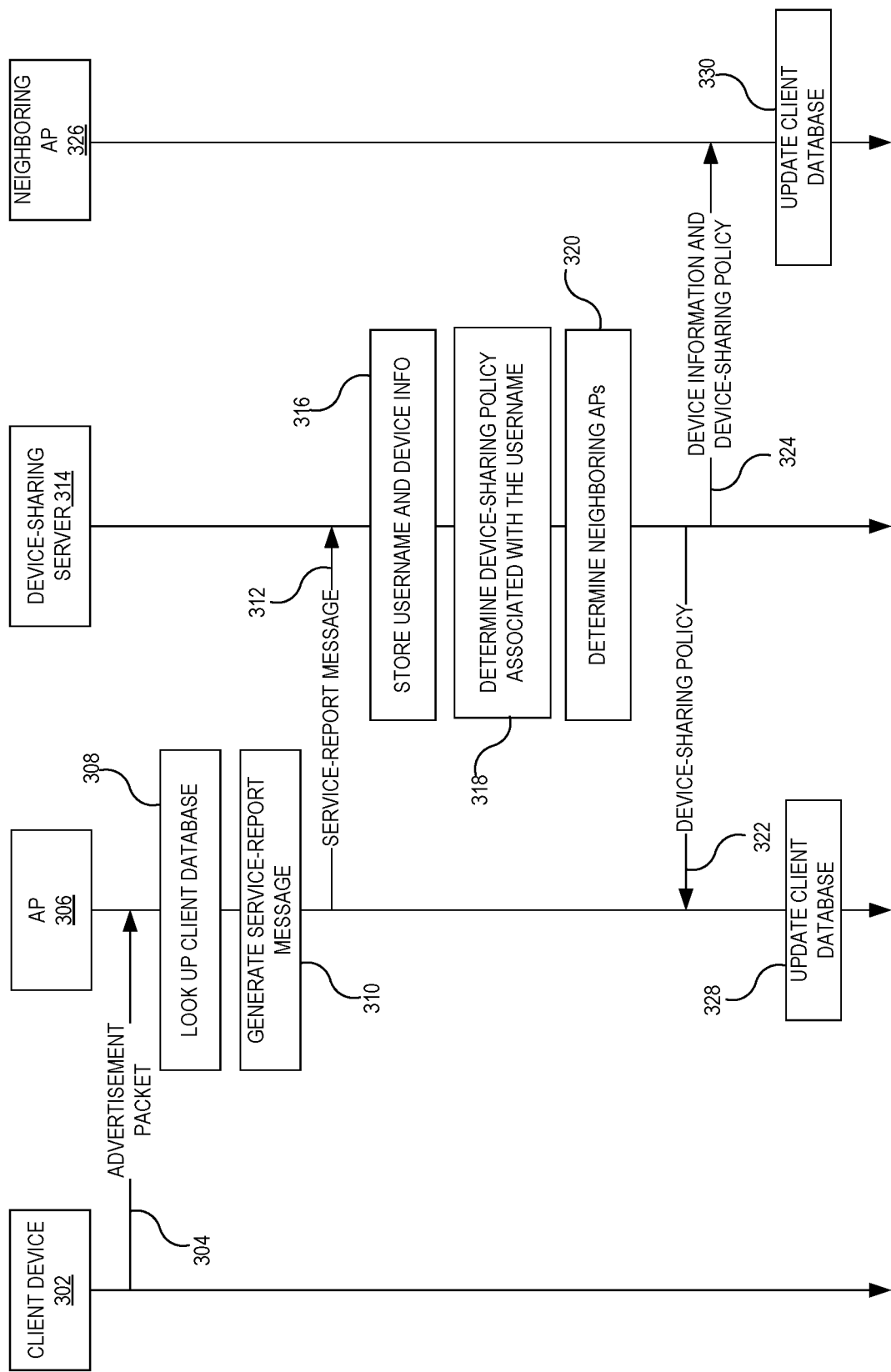
FIG. 3 illustrates an example of a process for advertising services, according to one aspect of the instant application.

FIG. 3 illustrates an example of a process for advertising services, according to one aspect of the instant application. A client device can only advertise services to the network after it has gained access to the network. In other words, the ownership information associated with the client device has been recorded at the AP through which the client device accesses the network. When the client device roams to another AP in the network, the ownership information can also be copied from the previous AP to the current AP. The process for the client device to gain access to the network can be similar to the process shown in FIG. 2.

During operation, a client device 302 can send an advertisement packet 304 to an AP 306. The advertisement packet can be an mDNS packet that contains information regarding the properties and functionalities of the client device issuing the advertisement packet. More specifically, the payload of the mDNS packet can include a number of record fields used to identify one or more services being advertised, including the name, type, port, and other information associated with the services. For example, a client device that is AirPlay ready can send out advertisement packets indicating that it can provide AirPlay services. According to the mDNS protocol, client device 302 can periodically send advertisement packets to the network. Upon receiving advertisement packet 304, AP 306 can look up its client database to identify a username associated with client device 302 (operation 308). As discussed previously, AP 306 maintains a client database that stores the mapping between client devices and their owners. For example, an entry in the client database can specify the MAC address of a client device and a username associated with the owner of the client device.

AP 306 can subsequently generate a service-report message based on advertisement packet 304 and the username (operation 310). Note that service-report messages are messages used by APs to communicate with a device-sharing server providing the device-sharing services to client devices in the network. The format of the service-report messages has been previously negotiated and agreed upon between the APs and the device-sharing server. According to some aspects, AP 306 can generate the service-report message by encapsulating the payload of advertisement packet 304 and the username into a language- and platform-neutral Protocol Buffers (protobuf) message. According to further aspects, the protobuf message can include the record fields contained in mDNS advertisement packet 304 and the username. In one example, in addition to the username, the service-report message can also include the network role of the user.

AP 306 can send a service-report message 312 to a device-sharing server 314, which can be a standalone server or a cloud-based service platform. According to some aspects, AP 306 can periodically send service-report message 312 to service-sharing server 314. The interval between consecutive service-report messages can be between 30 seconds and a few minutes. In one example, AP can send a service-report message to device-sharing server 314 every two minutes. Device-sharing server 314 can store information included in service-report message 312 (e.g., the username, network role of the user, and the device information) in a device database (operation 316). The device information can include but is not limited to the MAC address of the device and the type of service provided by the device. Note that the device and username/role information in the device database is updated by the advertisement packets, and there is no longer the need for frequent information exchange between device-sharing server 314 and the authentication server, thus significantly reducing the consumption of the bandwidth and computation power.

Device-sharing server 314 can further determine a device-sharing policy associated with the username (operation 318). In one example, device-sharing server 314 can use the role-based access control (RBAC) policy to determine whether the network role associated with the username is an administrative role or whether the username has administrative privilege. Note that an administrative account is usually associated with public devices. For example, a shared printer is often logged into the network by a user of an administrative role. Accordingly, the device-sharing policy for the printer can indicate that the printer can be shared by any client device. On the other hand, the device-sharing policy for a non-administrative username can indicate that the device can only be shared by client devices belonging to the same owner (i.e., client devices associated with the same username). According to one aspect, a user may be allowed to define a device-sharing policy such that the user's personal devices can be shared by devices owned by one or more friends. For example, the user may be presented a user interface allowing the user to enter the username of one or more friends such that client devices associated with the friends can have access to the user's personal devices.

Device-sharing server 314 can also determine a number of neighboring APs of AP 306 (operation 320). According to some aspects, device-sharing server 314 can interact with a network-management service (e.g., AirMatch) to obtain a list of the neighboring APs. Device-sharing server 314 can subsequently send a message 322 that contains the device-sharing policy to AP 306. In addition, device-sharing server 314 can send a message 324 that contains both the device information (e.g., the MAC address, the username, and the content of service-report message 312) and the device-sharing policy to each neighboring AP, including neighboring AP 326. Like service-report message 312, messages 322 and 324 can be protobuf messages. There can be other possibilities for the format of the messages exchanged between device-sharing server 314 and APs in the network. The scope of this disclosure is not limited by the format of these messages.

Upon receiving the device-sharing policy included in message 322, AP 306 can update its client database to include the device-sharing policy in the entry associated with client device 302 (operation 328). Similarly, upon receiving message 324, each neighboring AP (e.g., neighboring AP 326) can update its client database (operation 330). For example, neighboring AP 326 can generate an entry corresponding to client device 302 in its client database, and the entry can include the device information and the corresponding device-sharing policy. The updated client database allows each AP to enforce the device-sharing policy.

As can be seen from FIG. 3, by forwarding the device information to neighboring APs, the device-sharing server can facilitate each neighboring AP in maintaining a record of the service-providing device such that a service-requesting device can query the provided services by communicating with any AP. Moreover, the ownership information associated with a service-providing client device can be stored at the device-sharing server without the need for manual registration of such a device.

Figure 4:
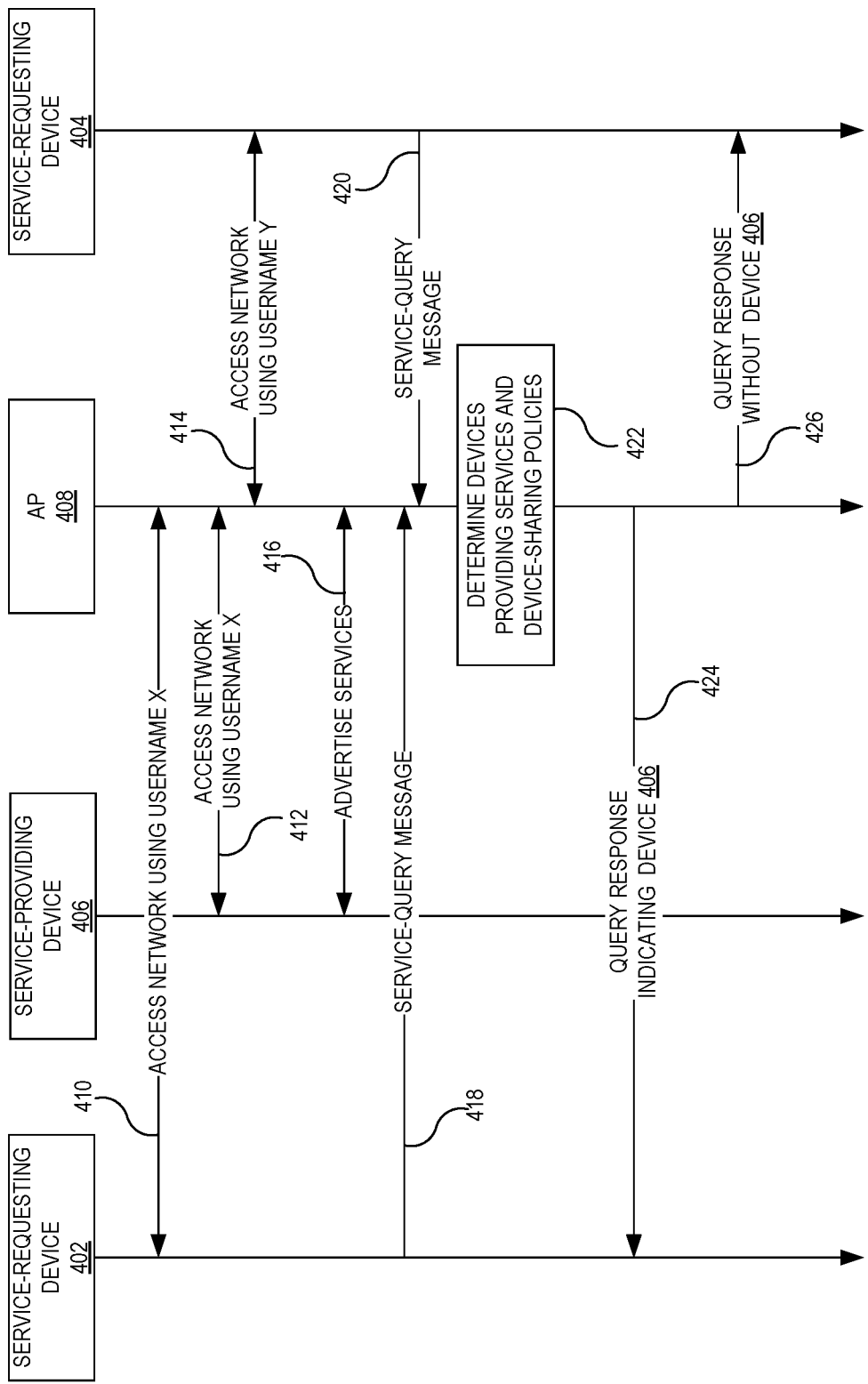
FIG. 4 illustrates an example of a process for querying services, according to one aspect of the instant application.

FIG. 4 illustrates an example of a process for querying services, according to one aspect of the instant application. In the example shown in FIG. 4, the network can include a number of service-requesting devices (e.g., devices 402 and 404), a number of service-providing devices (e.g., device 406), and a number of APs (e.g., AP 408). Service-requesting device 402 and service-providing device 406 belong to the same user and can both access the network using an MPSK password associated with a username X by establishing a secure connection with AP 408 (operations 410 and 412). On the other hand, service-requesting device 404 belongs to a different user and can access the network using an MPSK password associated with a username Y by establishing a secure connection with AP 408 (operation 414). Note that "service-requesting device" and "service-providing device" are relative terms because a single device may request and provide services at the same time. A client device can be referred to as a service-requesting device when the disclosure describes its service-requesting behaviors. Similarly, a client device can be referred to as a service-providing device when its service-providing behaviors are described. Each device can access the network using a process similar to the one shown in FIG. 2.

Subsequent to gaining access to the network, service-providing device 406 can communicate with AP 408 to advertise services (operation 416). This operation can be similar to the process shown in FIG. 3, which can include AP 408 forwarding the device information associated with service-providing device 406 to a device-sharing server and the device-sharing server populating such information to neighboring APs.

AP 408 can receive a service-query message 418 from service-requesting device 402 and a service-query message 420 from service-requesting device 404. Each service-query message may query devices that provide a predetermined type of service in the network. Upon receiving a service-query message (e.g., message 418 or 420), AP 408 can look up its client database to identify devices that can provide the requested service and their corresponding device-sharing policies (operation 422). More specifically, for each identified service-providing device, AP 408 can determine its owner's username and a device-sharing policy associated with the username. For example, AP 408 can determine that servicer-providing device 406 can provide the requested service and that the username of the device owner is X. AP 408 can further determine that the device-sharing policy associated with username X is "private," meaning that a device owned by this user can only be shared by devices belonging to the same owner. In the case where a user has granted access permission to one or more friends, the device-sharing policy may indicate the usernames of the friends.

Accordingly, AP 408 can respond to service-query message 418 with a query response 424 sent to service-requesting device 402. Query response 424 indicates to service-requesting device 402 that service-providing device 406 (which also belongs to the device owner with username X) can provide the requested service. In addition, AP 408 can respond to service-query message 420 with a query response 426 sent to service-requesting device 404. Because service-requesting device 404 belongs to a different owner (i.e., the user with username Y), service-providing device 406 will not be visible to service-requesting device 404, meaning that query response 426 will not indicate service-providing device 406 as a device providing the requested service. Instead, query response 426 may include other service-providing devices belonging to the device owner with username Y or, if no such device exists in the network, indicate that no matching device is found. In a situation where the user with username X has granted access permission to the user with username Y, query response 426 may also include service-providing device 406.

Figure 5:
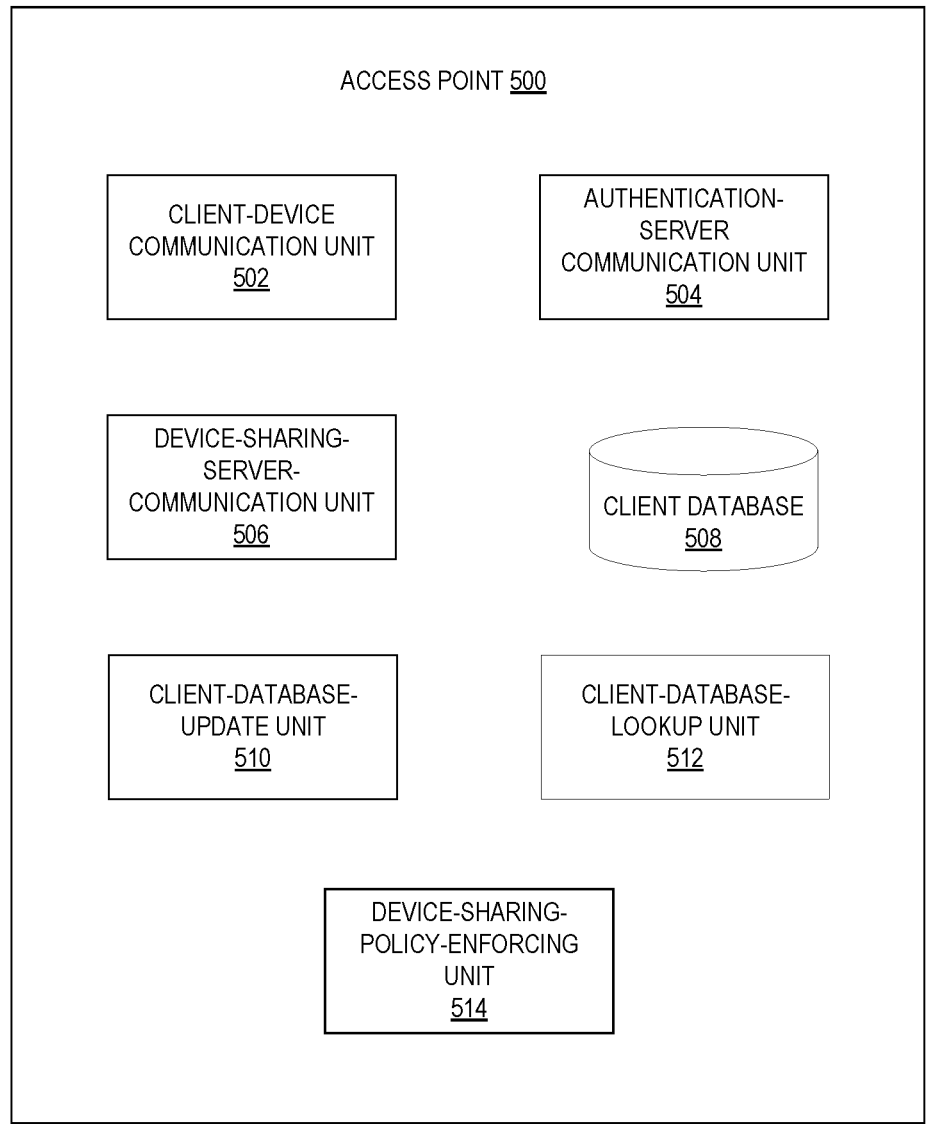
FIG. 5 illustrates an example of the block diagram of a wireless access point, according to one aspect of the instant application.

FIG. 5 illustrates an example of the block diagram of a wireless access point, according to one aspect of the instant application. AP 500 can include a client-device-communication unit 502, an authentication-server-communication unit 504, a device-sharing-server communication unit 506, a client database 508, a client-database-update unit 510, a client-database-lookup unit 512, and a device-sharing-policy-enforcing unit 514. In addition to the various functional blocks or units shown in FIG. 5, AP 500 can include other types of functional blocks or units that can facilitate the operations of AP 500, such as providing wireless network access services to client devices.

Client-device-communication unit 502 can be responsible for communicating with client devices, such as receiving network-access requests and performing handshakes to establish connections. Client-device-communication unit 502 can further receive advertisement packets and service-query messages from client devices and send query responses to client devices.

Authentication-server-communication unit 504 can be responsible for communicating with a remote authentication server (e.g., a RADIUS server). For example, when a client device requests network access using an MPSK password, authentication-server-communication unit 504 can send a RADIUS request that carries the MPSK password and the MAC address of the client device to the authentication server. In response, authentication-server-communication unit 504 can also receive an authentication response, with the VSA field in the authentication response including the username and network role of the owner of the client device.

Device-sharing-server-communication unit 506 can be responsible for communicating with a remote device-sharing server. More specifically, device-sharing server-communication unit 506 can generate and send, based on service-advertisement packets from client devices, service-report messages. In one example, device-sharing-server-communication unit 506 can generate a protobuf message to encapsulate the payload (e.g., resource records) of an mDNS advertisement packet from a client device and the username of the owner of the client device. Device-sharing-server-communication unit 506 can also receive, from the device-sharing server, a protobuf message that includes a device-sharing policy associated with the username. Device-sharing-server-communication unit 506 can also receive device information about a device coupled to a neighboring AP and the corresponding device-sharing policy.

Client database 508 can store information about client devices coupled to AP 500 and its neighboring APs. An entry in client database 508 can include the MAC address of a client device, the MPSK password used by the client device to access the network, a username associated with the client device, types of services provided by the client device (e.g., properties and functionalities of the client device), a device-sharing policy associated with the username, etc. Client-database-update unit 510 can be responsible for updating the content of client database 508 based on information received from the authentication server and the device-sharing server. For example, each time a new client device accesses the network, an entry can be created in client database 503 by client-database-update unit 510. Moreover, when a client device advertises services, client-database-update unit 510 can update a corresponding entry in client database 508 based on the content of the advertisement packets.

Client-database-lookup unit 512 can be responsible for performing a lookup operation in client database 508 in response to a service-query message (e.g., an mDNS query). For example, the service-query message may specify a type of service, and client-database-lookup unit 512 can identify client devices providing the requested service. Moreover, client-database-lookup unit 512 can determine the device-sharing policy associated with each identified client device (i.e., whether the client device is a private device or a public device). Device-sharing-policy-enforcing unit 514 can be responsible for enforcing the device-sharing policy. More specifically, if a service-providing device is a private device, device-sharing-policy-enforcing unit 514 can ensure that the service-providing device can only be visible to client devices belonging to the same owner or one or more friends specified by the device-sharing policy. For example, device-sharing-policy-enforcing unit 514 can generate the mDNS response messages based on whether the requesting client devices belong to the same owner or the specified friends.

Figure 6:
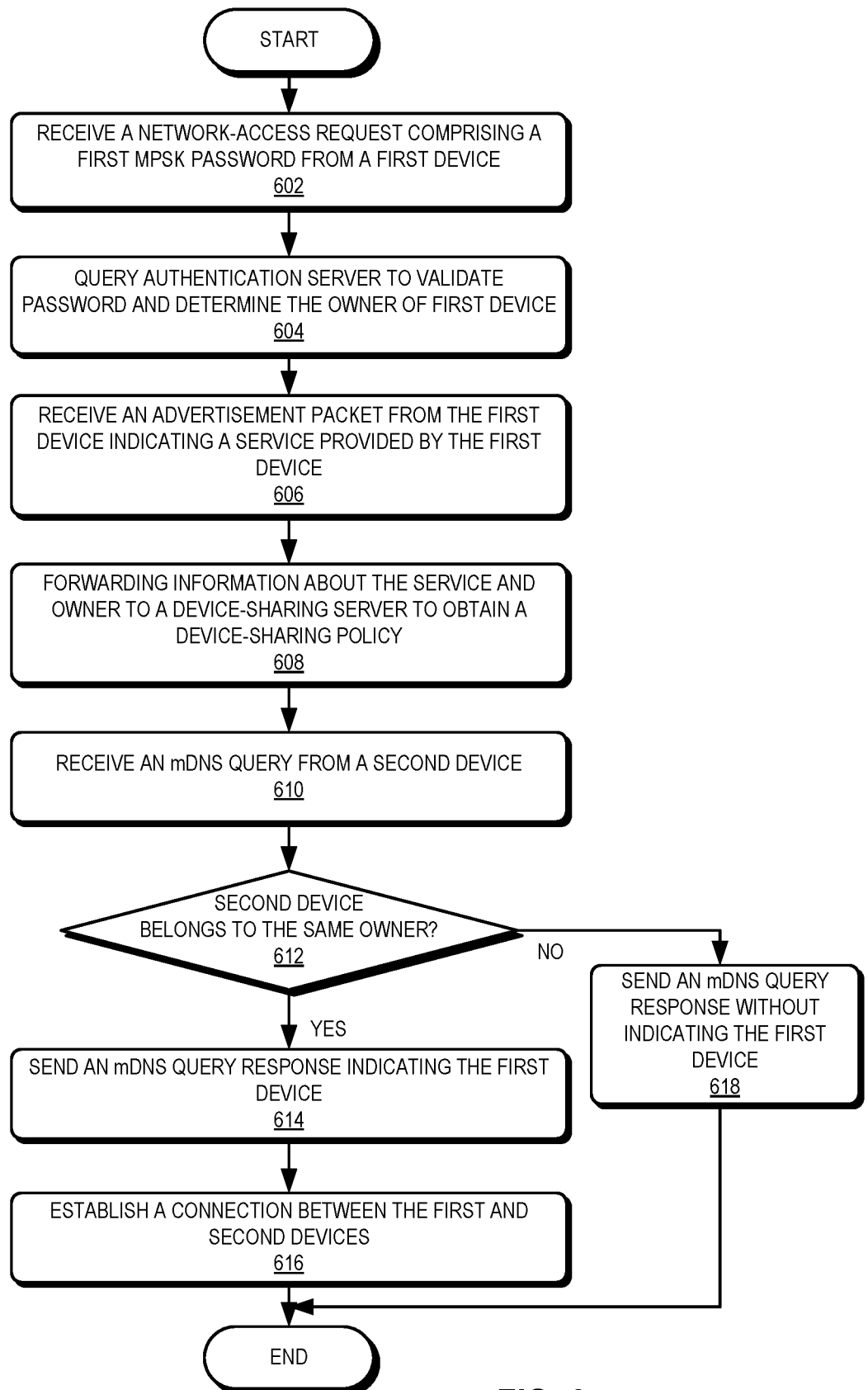
FIG. 6 presents a flowchart illustrating an example of a device-sharing process, according to one aspect of the instant application.

FIG. 6 presents a flowchart illustrating an example of a device-sharing process, according to one aspect of the instant application. During operation, an AP can receive, from a first client device, a network-access request comprising a first MPSK password (operation 602). Note that the network has been configured with an MPSK service set identifier (SSID), meaning that the single SSID can support multiple PSKs. Each user can obtain a user-specific MPSK password through a separate user-authentication process. In addition to the user-specific MPSK password, each user can also be associated with a unique username that can be used to identify the user.

In response to the network-access request, the AP can query a remote authentication server to validate the MPSK password and determine the owner of the first device (operation 604). For example, the remote server can be a RADIUS server, and the AP can send a RADIUS request that includes the MAC address of the client device and the MPSK password. The RADIUS server can look up its user-information database to validate the MPSK password and match a username to the MPSK password. The username corresponds to the owner of the first device.

The AP can subsequently receive, from the first device, an advertisement packet indicating a service provided by the first device (operation 606). The advertisement packet can be an mDNS advertisement with a number of resource records. The resource records can indicate one or more services provided by the first device. Upon receiving the advertisement packet, the AP can forward information about the service and the owner to a device-sharing server to obtain a device-sharing policy associated with the owner (operation 608). According to some aspects, the AP can generate a protobuf message that includes the resource records of the mDNS advertisement and the username/role of the owner of the first device. Based on the username, the device-sharing server can determine a device-sharing policy and return the device-sharing policy to the AP such that the AP can enforce the device-sharing policy.

The AP can receive from a second device an mDNS query (operation 610). According to some aspects, the mDNS query can specify one or more services requested by the second device. The AP can determine whether the second device belongs to the same owner as the first device (operation 612). The second device has previously used a second MPSK password to access the network, and the AP can match a username to the second MPSK password by looking up its client database. In one example, the mDNS query can also indicate the MAC address of the second device, and the AP can look up an entry in the client database corresponding to the MAC address. The entry can include the username of the owner of the second device. The entry may also include the network role of the username.

In response to determining that the second device belongs to the owner of the first device, the AP can send an mDNS query response to the second device, with the query response indicating that the first device provides the requested service (operation 614). A connection between the first and second devices can then be established to allow the second device to access the service provided by the first device (operation 616). On the other hand, if the AP determines that the second device belongs to a different owner, the AP can send an mDNS query response to the second device without indicating the first device in the query response (operation 618). Note that if the AP determines that the first device is a public device or if the owner of the second device is a friend of the owner of the first device, the AP may also include the first device in the mDNS query response to the second device, even though the two devices belong to different owners.

Figure 7:
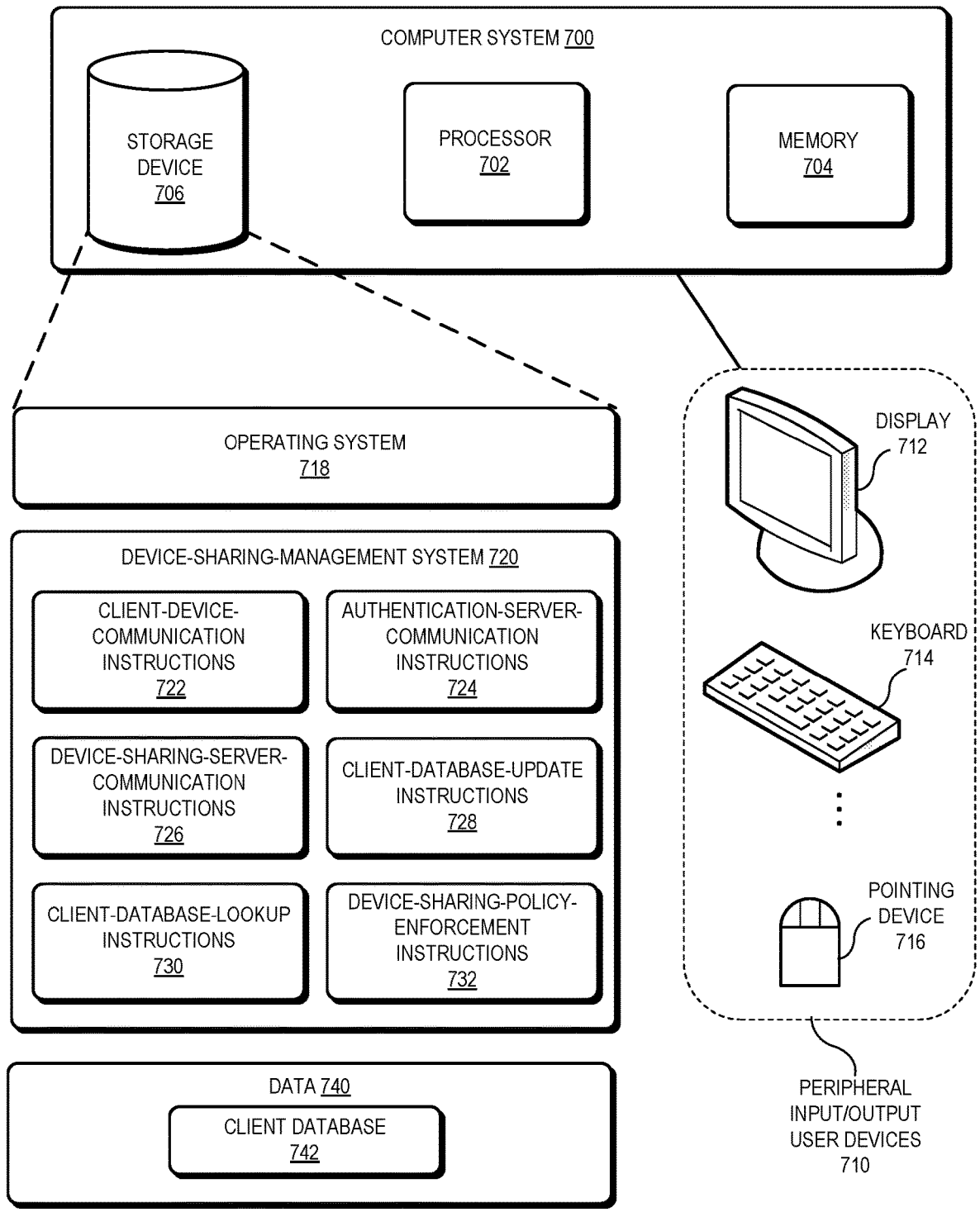
FIG. 7 illustrates an example of a computer system that facilitates the management of device sharing, according to one aspect of the instant application.

FIG. 7 illustrates an example of a computer system that facilitates the management of device sharing, according to one aspect of the instant application. Computer system 700 can include a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 718, a device-sharing-management system 720, and data 740. According to some aspects, computer system 700 can be implemented as function blocks included in an AP.

Device-sharing-management system 720 can include instructions, which when executed by computer system 700, can cause computer system 700 or processor 702 to perform methods and/or processes described in this disclosure. Specifically, by executing these instructions, computer system 700 can achieve the goal of managing the sharing of client devices without the need for manual registration. Device-sharing-management system 720 can include instructions for communicating with client devices (client-device-communication instructions 722), instructions for communicating with an authentication server to determine the username associated with a client device (authentication-server-communication instructions 724), instructions for communicating with a device-sharing server to report device information and obtain the device-sharing policy (device-sharing-server-communication instructions 726), instructions for updating a client database based on information received from the client devices, authentication server, and device-sharing server (client-database-update instructions 728), instructions for performing lookup operations in the client database (client-database-lookup instructions 730), and instructions for enforcing the device-sharing policies (device-sharing-policy-enforcement instructions 732). Data 740 can include a client database 742.

In general, the disclosure describes a system and method for enabling device sharing in a large-scale network without the burden of manual device registration and intensive record updating. More specifically, by configuring the network with MPSK SSID, the system can link the passwords used by client devices to access the network to the identity of the respective device owners such that each time a client device accesses the network and advertises for services, the system can automatically register the device. Moreover, by implementing a device-sharing server that can populate information about a client device (e.g., the type of service provided by the client device) and the corresponding device-sharing policy among neighboring APs, the system allows each AP to enforce the device-sharing policy based on the ownership of devices requesting and providing services. There is no need for frequent information exchange between the device-sharing server and an authentication server authenticating the users, thus significantly reducing the bandwidth and computation power consumption.

One aspect can provide a system and method for device sharing. During operation, an access point (AP) can receive a network-access request comprising a first multi-pre-shared key (MPSK) password and query an authentication server to determine an owner of a first device based on the first MPSK password. The AP can further receive, from the first device, an advertisement packet indicating a service provided by the first device and forward information associated with the service and the owner to a device-sharing server to obtain a device-sharing policy associated with the owner. The AP enforcing the device-sharing policy, which can include receiving from a second device, a multicast Domain Name System (mDNS) query, indicating the first device in an mDNS response corresponding to the mDNS query in response to determining that the second device belongs to the owner of the first device based on a second MPSK password of the second device, and establishing a connection between the first and second devices to allow the second device to access the service provided by the first device.

In a variation on this aspect, enforcing the device-sharing policy can further include excluding the first device from the mDNS response corresponding to the mDNS query in response to determining that the second device does not belong to the owner of the first device based on the second MPSK password of the second device.

In a variation on this aspect, querying the authentication server can include forwarding the network-access request to the authentication server that stores a mapping relationship between the MPSK password and a username of the owner of the first device, and receiving, from the authentication server, a network-access response indicating the username and a network role associated with the username.

In a further variation, the authentication server can include a Remote Authentication Dial-In User Service (RADIUS) server; the network-access request can include a RADIUS request; and the network response can include a RADIUS response with the username and network role included in a vendor-specific attribute (VSA) field of RADIUS response.

In a further variation, the device-sharing policy can be determined by the device-sharing server based on the username and the network role.

In a further variation, in response to determining that the network role has administrative privilege, the AP can obtain a device-sharing policy indicating that the first device is a public device and allow any device to access the service provided by the first device.

In a variation on this aspect, the device-sharing server can forward information associated with the service provided by the first device and the device-sharing policy to one or more neighboring APs. A neighboring AP can respond to an mDNS query from a third device coupled to the neighboring AP based on the device-sharing policy.

In a variation on this aspect, the AP can maintain a client database that stores one or more of: an address of the first device, information about the owner of the first device, the service provided by the first device, and the device-sharing policy.

In a variation on this aspect, the advertisement packet can include an mDNS advertisement packet with one more resource records.

In a further variation, forwarding the information associated with the service and the owner comprises generating a Protocol Buffers (protobuf) message that encapsulates the resource records and a username associated with the owner.

The above description is presented to enable any person skilled in the art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method comprising:
    receiving, at an access point (AP), a network-access request comprising a first multi-pre-shared key (MPSK) password;
    querying an authentication server to determine an owner of a first device based on the first MPSK password;
    receiving, by the AP from the first device, an advertisement packet indicating a service provided by the first device;
    forwarding information associated with the service and the owner to a device-sharing server to obtain a device-sharing policy associated with the owner;
    enforcing the device-sharing policy, which comprises
        receiving from a second device, a multicast Domain Name System (mDNS) query;
        in response to determining that the second device belongs to the owner of the first device based on a second MPSK password of the second device, indicating the first device in an mDNS response corresponding to the mDNS query; and
        establishing a connection between the first and second devices to allow the second device to access the service provided by the first device.

2. The method of claim 1, wherein enforcing the device-sharing policy further comprises:
    in response to determining that the second device does not belong to the owner of the first device based on the second MPSK password of the second device, excluding the first device from the mDNS response corresponding to the mDNS query.

3. The method of claim 1, wherein querying the authentication server comprises:

forwarding the network-access request to the authentication server that stores a mapping relationship between the MPSK password and a username of the owner of the first device; and receiving, from the authentication server, a network-access response indicating the username and a network role associated with the username.

4. The method of claim 3,
wherein the authentication server comprises a Remote Authentication Dial-in User Service (RADIUS) server;
wherein the network-access request comprises a RADIUS request; and
wherein the network response comprises a RADIUS response with the username and network role included in a vendor-specific attribute (VSA) field of RADIUS response.

5. The method of claim 3, wherein the device-sharing policy is determined by the device-sharing server based on the username and the network role.

6. The method of claim 5, further comprising:
in response to determining that the network role has administrative privilege, obtaining a device-sharing policy indicating that the first device is a public device; and
allowing any device to access the service provided by the first device.

7. The method of claim 1, further comprising:
forwarding, by the device-sharing server, information associated with the service provided by the first device and the device-sharing policy to one or more neighboring APs; and
responding, by a neighboring AP, to an mDNS query from a third device coupled to the neighboring AP based on the device-sharing policy.

8. The method of claim 1, further comprising maintaining a client database that stores one or more of:
an address of the first device;
information about the owner of the first device;
the service provided by the first device; and
the device-sharing policy.

9. The method of claim 1, wherein the advertisement packet comprises an mDNS advertisement packet with one more resource records.

10. The method of claim 9, wherein forwarding the information associated with the service and the owner comprises generating a Protocol Buffers (protobuf) message that encapsulates the resource records and a username associated with the owner.

11. A wireless access point (AP) comprising:
a processor;
a memory storing instructions that when executed by the processor cause the processor to perform a method, the method comprising:
receiving a network-access request comprising a first multi-pre-shared key (MPSK) password;
querying an authentication server to determine an owner of a first device based on the first MPSK password;
receiving, from the first device, an advertisement packet indicating a service provided by the first device;
forwarding information associated with the service and the owner to a device-sharing server to obtain a device-sharing policy associated with the owner;
enforcing the device-sharing policy, which comprises receiving from a second device, a multicast Domain Name System (mDNS) query;
in response to determining that the second device belongs to the owner of the first device based on a second MPSK password of the second device, indicating the first device in an mDNS response corresponding to the mDNS query; and
establishing a connection between the first and second devices to allow the second device to access the service provided by the first device.

12. The AP of claim 11, wherein enforcing the device-sharing policy further comprises:
in response to determining that the second device does not belong to the owner of the first device based on the second MPSK password of the second device, excluding the first device from the mDNS response corresponding to the mDNS query.

13. The AP of claim 10, wherein querying the authentication server comprises:
forwarding the network-access request to the authentication server that stores a mapping relationship between the MPSK password and a username of the owner of the first device; and
receiving, from the authentication server, a network-access response indicating the username and a network role associated with the username.

14. The AP of claim 13,
wherein the authentication server comprises a Remote Authentication Dial-In User Service (RADIUS) server;
wherein the network-access request comprises a RADIUS request; and
wherein the network response comprises a RADIUS response with the username and network role included in a vendor-specific attribute (VSA) field of RADIUS response.

15. The AP of claim 13, wherein the device-sharing policy is determined by the device-sharing server based on the username and the network role.

16. The AP of claim 15, wherein the method further comprises:
in response to determining that the network role has administrative privilege, obtaining a device-sharing policy indicating that the first device is a public device; and
allowing any device to access the service provided by the first device.

17. The AP of claim 11, wherein the method further comprises:
forwarding, by the device-sharing server, information associated with the service provided by the first device and the device-sharing policy to one or more neighboring APs; and
responding, by a neighboring AP, to an mDNS query from a third device coupled to the neighboring AP based on the device-sharing policy.

18. The AP of claim 11, wherein the method further comprises maintaining a client database that stores one or more of:
an address of the first device;
information about the owner of the first device;
the service provided by the first device; and
the device-sharing policy.

19. The AP of claim 11, wherein the advertisement packet comprises an mDNS advertisement packet with one more resource records.

20. The AP of claim 19, wherein forwarding the information associated with the service and the owner comprises generating a Protocol Buffers (protobuf) message that encapsulates the resource records and a username associated with the owner.

* * * * *